UNITED STATES PATENT OFFICE.

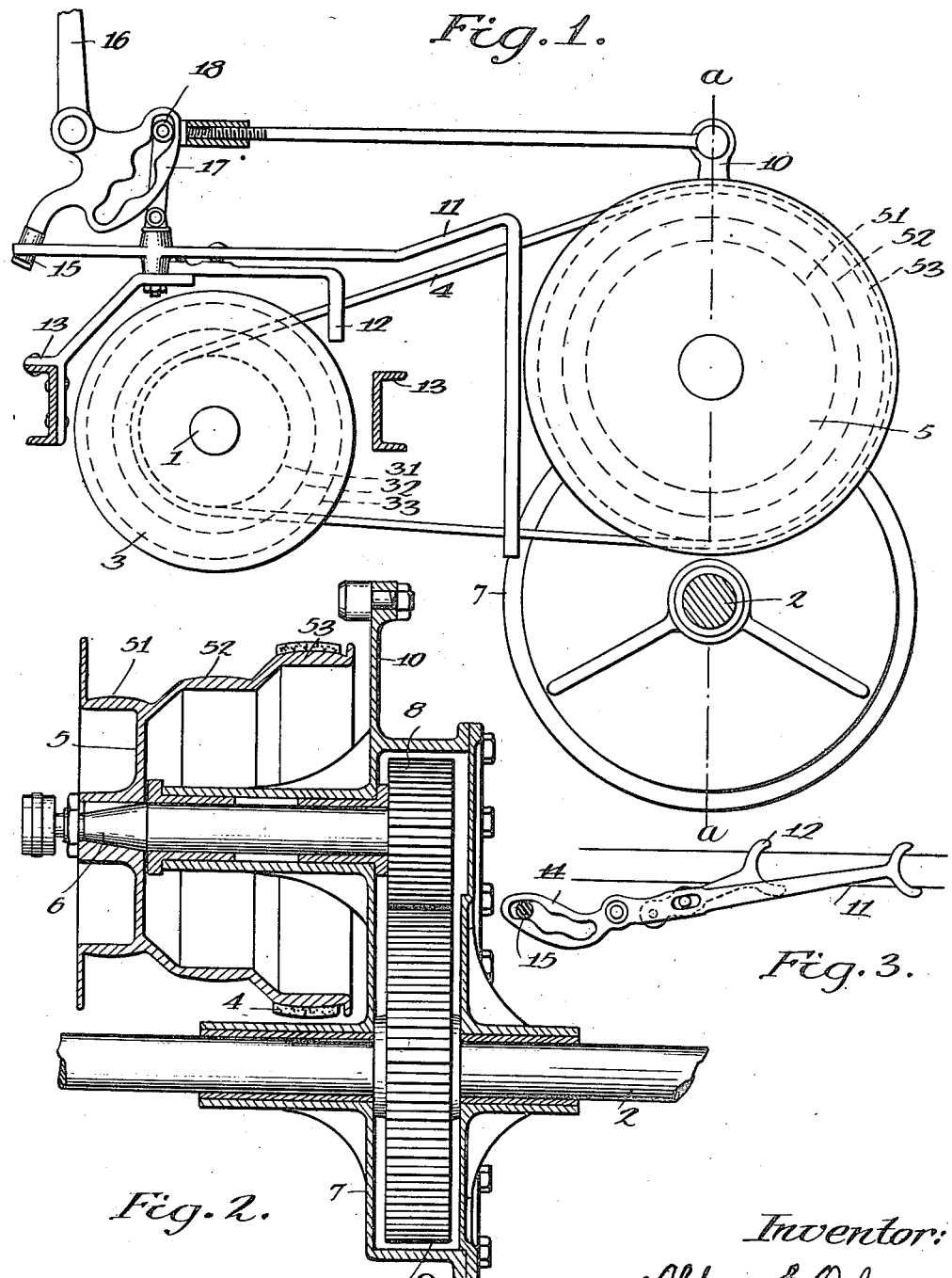

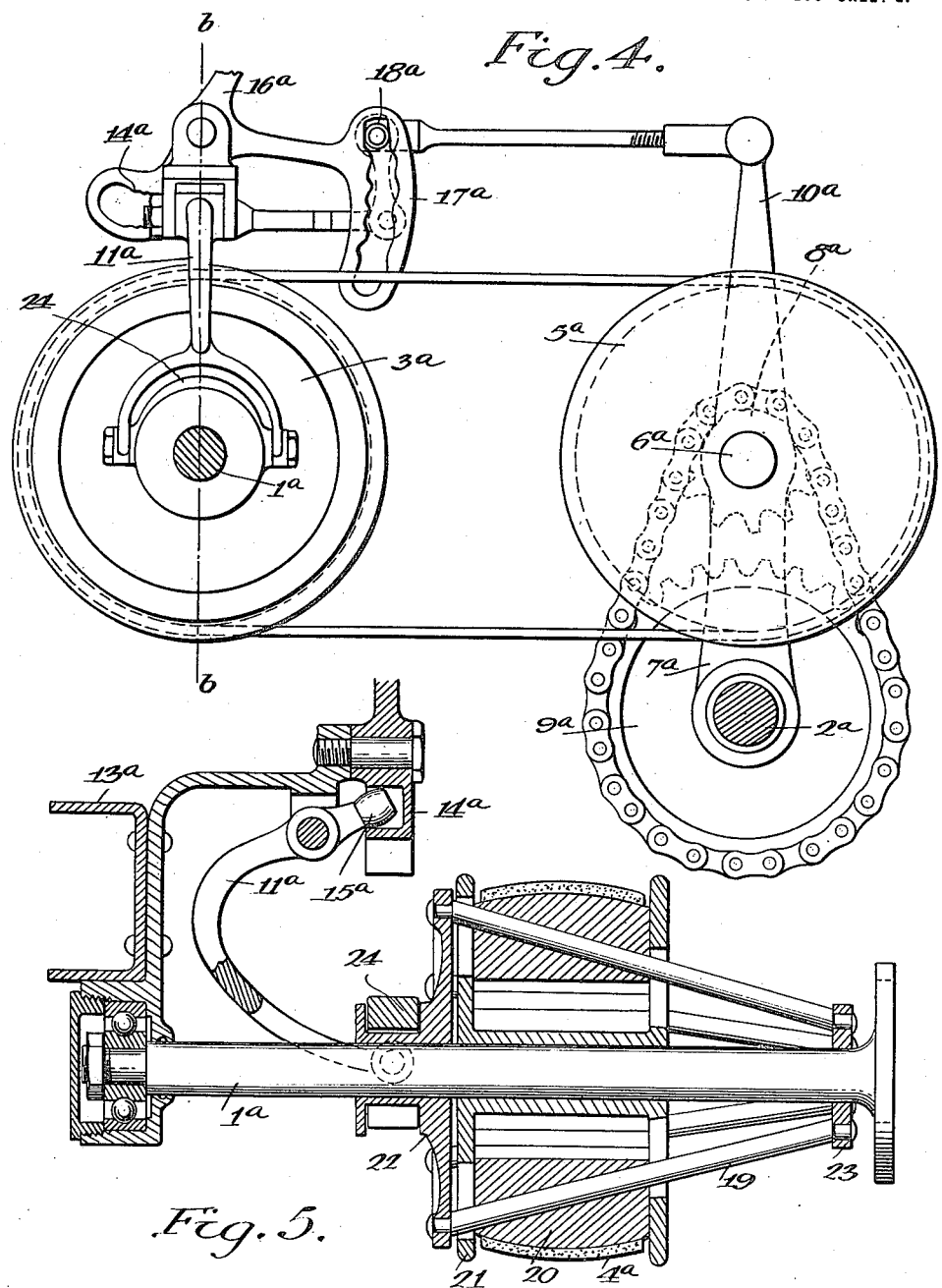

ALDEN E. OSBORN, OF NEW YORK, N. Y.

POWER-TRANSMITTING MECHANISM.

1,181,476.  Specification of Letters Patent.  Patented May 2, 1916.

Application filed September 27, 1912. Serial No. 722,743.

*To all whom it may concern:*

Be it known that I, ALDEN E. OSBORN, of the city of New York, borough of the Bronx, county and State of New York, have invented certain new and useful Improvements in Power-Transmitting Mechanism, of which the following is a full, clear, and exact description, such as will enable others skilled in the art to which it appertains to make and use the same.

My invention relates to a power transmitting mechanism, particularly for motor vehicles, which is of the general type set forth in my Patent Number 1,049,260 issued to me upon Dec. 31, 1912, but having certain improvements thereon hereinafter set forth and claimed.

Reference is to be had to the accompanying drawings in which:—

Figure 6:
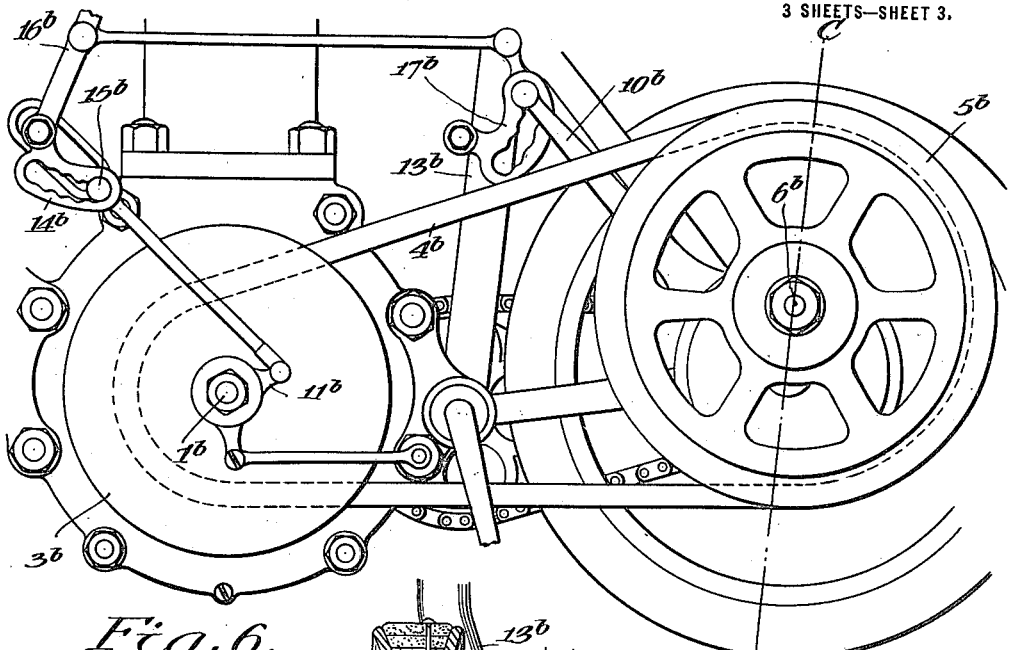
Figure 7:
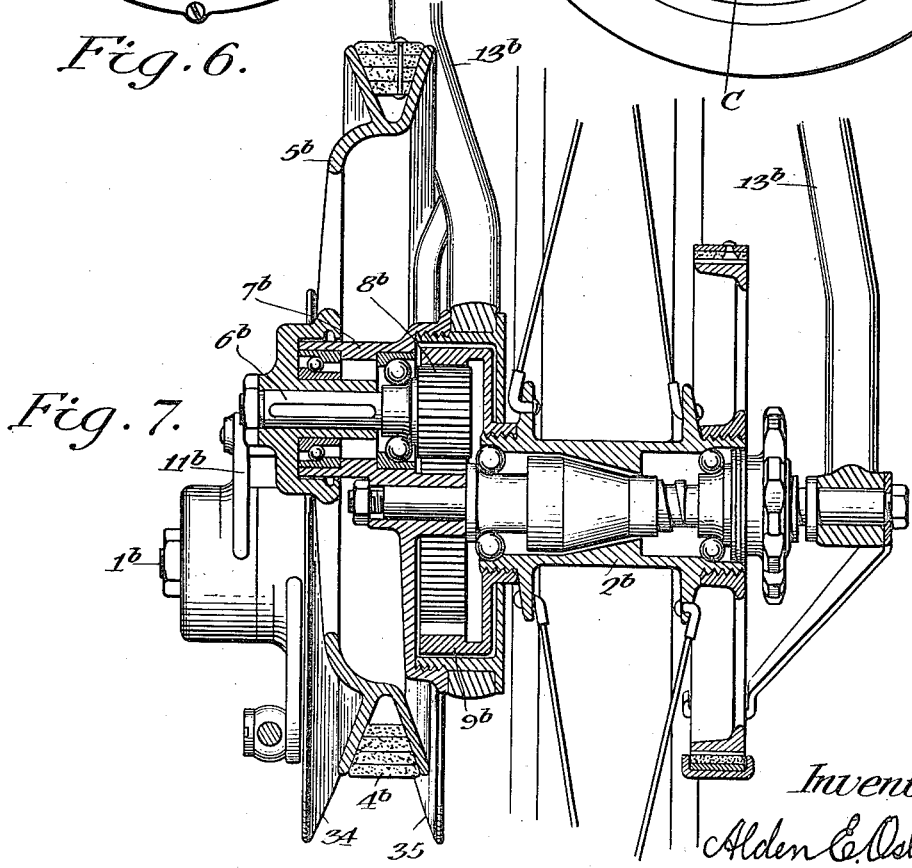

Figure 1 represents a side elevation of one form of my device. Fig. 2 represents a partial sectional view taken on the line *a—a* of the device shown in Fig. 1; Fig. 3 shows a detail of the controlling mechanism for operating the device shown in Figs. 1 and 2; Fig. 4 represents a side elevation of a modification of the mechanism shown in Figs. 1, 2 and 3; Fig. 5 represents a partial sectional view taken on the line *b—b*, of the mechanism shown in Fig. 4; Fig. 6 represents a side elevation of a still further modification and Fig. 7 represents a partial sectional view, taken on the line *c—c*, of the mechanism shown in Fig. 6.

In my Patent Number 1,049,260 issued December 31, 1912, there is shown a combined belt and gear power transmitting device giving a single or several speed ratios which when arranged for giving more than one speed requires a duplication of the pulleys, gear and certain other parts, while the device herein set forth enables the obtaining of two or more speeds without adding any more pulleys or gears than are contained in the device shown in said patent giving one speed only.

In Fig. 1 of the accompanying drawings 1 represents the driving member or engine shaft, 2 represents the driven member, 3 represents a pulley fastened to the driving member 1 and having two or more different diameter belt supporting surfaces 31, 32, &c., which surfaces are connected by slightly coned surfaces for the purpose hereinafter described. Upon this driving pulley 3 is a belt 4 which belt also runs upon a suitable driven pulley 5. This pulley being like the driving pulley in that it also is provided with a corresponding number of different diameter surfaces 51, 52, &c., and connecting cone surfaces. These surfaces are, however, arranged in opposite relation to the surfaces of the driving pulley 3 so that when the belt 4 is on the largest diameter surface of the pulley 3 it is on the smallest diameter surface of pulley 5 and vice versa; the ratio between the sizes of the different surfaces being preferably such that the belt tension is correct with an equal distance between pulley centers, no matter on which of the corresponding belt surfaces of the driving and driven pulleys it happens to rest. The driven pulley 5, as is more clearly shown in Fig. 2 is mounted on a counter shaft 6 which is rotatable in the carrier 7 which carrier is mounted to rotate about the axis of the driven member 2 (in this case shown as a shaft) so that the counter shaft 6 and pulley 5 can be rotated about the driven member 2 and nearer to or farther from the driving pulley 3, to obtain the proper belt tension, without substantially altering the distance between said shaft 6 and the driven member 2. This shaft and driven member are connected by the gears 8 and 9 respectively or sprockets and a chain or other means whereby the motion of one is transmitted to the other.

In order to accomplish the rotation of the carrier 7, for regulating the belt tension, I have shown an arm 10 attached thereto which may be operated in any convenient manner as is also the case with the means for shifting the said belt from one of the aforementioned pulley surfaces to another. I have shown for this shifting of the belt two forked levers 11 and 12 which are pivoted on some convenient part of the vehicle frame 13 and act upon the belt adjacent to both the driving pulley 3 and driven pulley 5. Should it be desired both these belt shifting and belt tension devices may be connected to and operated by a single lever and when this single operating lever is employed I have provided an arrangement whereby upon its movement releasing the belt tension its further movement operates to shift said belt and to thereafter tighten said belt to the proper driving tension:—the shifting of the belt occurring when its tension has been released. This is accomplished by providing a suitable cam plate 14 (as shown particularly in Fig. 3) connected with the belt shifters 11 and 12 and actuated by the roller 15 on the lever 16, and a second cam plate 17 connected with this lever 16 and acting on the roller 18 connected to the arm 10 controlling the belt tension. The cam plates 14 and 17 are so designed and are moved in such relation to each other that the shifting of the belt 4 to each new surface of the pulleys occurs preferably only each time the belt tension is released as suggested.

From the above it will be seen that in this form of my device the speed of the driven member is varied in relation to the speed of the driving member by altering the position of the belt from one set of belt supporting surfaces to another and also by regulating the belt tension as the tension may be so much released as to allow the driving member to revolve independently of the driven member. It is also obvious that the different speed ratios can be obtained if only one of the pulleys 3 or 5 be provided with the two or more different diameter belt surfaces (the other being straight) but in this case a greater movement of the counter shaft 6 around the axis of the driven member 2 would be required in order to obtain the required belt tension with the belt on the different surfaces.

In Figs. 4 and 5 of the drawings are shown a modification of the foregoing form of my device in that instead of shifting the belt from one diameter belt surface of the pulley or pulleys to another an expanding pulley is used to obtain the different diameter belt supporting surfaces and a variable speed ratio between driving and driven members.

For the sake of clearness certain of the parts corresponding to and functioning the same as similar parts in Figs. 1, 2 and 3 are represented by the same reference numerals and as their object will be understood by reference to the description of these figures they will not all be mentioned again.

The expanding pulley is preferably the driving pulley $3^a$ mounted upon the driving member or shaft $1^a$ and may be of any desired form. It is, however, shown in Fig. 5 as comprising a series of radial segments 20 movably supported in a cage 21 and expanded or contracted by slanted rods 19 which are supported by the collars 22 and 23. These collars and connected slanting rods form the expanding member and when slid along the shaft give the segments 20 different diameters according to their position. To actuate this segment expanding member a collar 24 is employed connected with the lever $11^a$, which is pivoted on a bracket attached to the supporting framework $13^a$. The belt tension is taken up through the rotation of the carrier $7^a$, which carrier is pivoted to revolve through a small arc about the center of the driven member $2^a$. This driven member carries the sprocket $9^a$ which is connected by a suitable chain to the sprocket $8^a$ on the counter shaft $6^a$ which counter shaft carries the driven pulley $5^a$. I prefer that the belt tension be released when each change of speed, by expanding or contracting the pulley segments, is being made, this obviously being easily accomplished by a suitable form of the cam $14^a$, attached to the operating lever $16^a$, operating the pulley controlling lever $11^a$. The cam $17^a$, also attached to the operating lever $16^a$, works the belt tension lever $10^a$ through giving the proper motion to the roller $18^a$ which rides in the cam groove. This roller $18^a$ can have a straight face whereas the roller $15^a$ which works in the cam $14^a$ is shown with a spherical face in order that it can follow around the center of pivoting of the lever $11^a$ to which it is attached. It is obvious that this form of my invention permits of obtaining a practically unlimited number of speeds between the lowest and the highest, although where the controlling means is arranged as just described it would be desirable to have the variation in speed ratio occur in small steps. A free engine can obviously be obtained when the belt tension is released the same as with the form of my device shown in Figs. 1, 2 and 3.

In Figs. 6 and 7 is shown a still further modification of my power transmitting mechanism. In these figures, as in Figs. 4 and 5, certain of the parts indicated by reference numerals are the same as similarly numbered parts of Figs. 1, 2 and 3 and will therefore not be mentioned in the following description. In this form the driving pulley $3^b$ and driven pulley $5^b$ are of a type suitable for a V-section belt $4^b$, as shown, or a round belt, and the driving pulley $3^b$ is so arranged that its two flanges 34 and 35 can be brought within varying distances of each other so that the belt $4^b$ can be forced to run on different diameter parts of the driving surfaces of said pulley flanges, thus giving it varying speeds in relation to the speed of the driving member or shaft $1^b$.

The means for controlling the distance of separation of the pulley flanges is preferably operated by suitable mechanism readily controlled by the vehicle driver and may be of any desired type. The exact construction of this flange separating mechanism forms no part of my present invention and need not be illustrated as several constructions that might be used are familiar to those skilled in the art. The drawing (Fig. 6), however, shows a lever $11^b$ used to control the distance of separation of the pulley flanges through the action of this mechanism, which lever is shown as connected with a cam plate 14$^b$, said cam being connected through the roller pin 15$^b$ which acts in the groove or slot in the said plate, to the lever 16$^b$ which also connects, through a suitable cam plate 17$^b$ to a lever 10$^b$ controlling the belt tension, in such a way that the belt tension is slightly released each time the pulley flanges are being forced into a new position while, as soon as the new position is assumed by the flanges, the belt is brought into proper driving tension.

The arrangement of the driven pulley 5$^b$, counter shaft 6$^b$, carrier 7$^b$, driven member 2$^b$ and gears 8$^b$ and 9$^b$ is shown in Fig. 7 and will be clearly understood in view of the description relating to Figs. 1, 2 and 3 and is such as would preferably be used when my mechanism is to be employed in connection with a motorcycle—the carrier 7$^b$ being rotatively held in a large socket in the frame 13$^b$ so that it can be swung about the axis of the driven member or hub 2$^b$ to enable the proper regulation of the belt tension. This type of my mechanism can, like the other forms, be modified to suit different requirements the principles of construction and operation remaining the same. While other methods of obtaining a free engine may be employed it would be desirable with this particular form of my device to have a clutch arranged between the driving shaft 1$^b$ and the driving pulley 3$^b$ so that said shaft can rotate without turning the pulley as the proper slipping action for a free engine cannot well be obtained by releasing the tension on a belt running on V grooved pulleys.

Having now described my invention what I claim as new, and desire to secure by Letters Patent, is:—

1. In a transmission gearing the combination of a rotary driving member, a rotary driven member, a counter shaft substantially parallel with both said driving and said driven members, a carrier for said counter shaft whereby said counter shaft is movable about the axis of rotation of said driven member, means for connecting said counter shaft and said driven member to transmit motion from one to the other, a pulley on said counter shaft, a pulley on said driving member, a belt to transmit motion between said pulleys, means whereby two or more different speeds can be given said pulley on said counter shaft without altering the speed of said pulley on said driving member, means for revolving said counter shaft carrier about the axis of said driven member to regulate the tension of said belt and a lever for controlling said mechanism connected both with the aforesaid speed changing means and with the belt tension regulating means, the latter connection including a cam so shaped as to maintain a suitable tension on said belt when the different speeds are operative and during the changing thereof.

2. In a transmission gearing the combination of a rotary driving member, a rotary driven member, a counter shaft substantially parallel with both said driving and said driven members, a carrier for said counter shaft whereby said counter shaft is movable about the axis of rotation of said driven member, means for connecting said counter shaft and said driven member to transmit motion from one to the other, a pulley on said counter shaft, a pulley on said driving member, a belt to transmit motion between said pulleys, means whereby two or more different speeds can be given said pulley on said counter shaft without altering the speed of said pulley on said driving member, means for revolving said counter shaft carrier about the axis of said driven member to regulate the tension of said belt and a lever for controlling said mechanism connected both with the aforesaid speed changing means and with the belt tension regulating means, the former connection including a cam so shaped as to cause said speed changes to occur in proper relation to the movement of said belt tension regulating means.

3. In a transmission gearing the combination of a rotary driving member, a rotary driven member, a counter shaft substantially parallel with both said driving and said driven members, a carrier for said counter shaft whereby said counter shaft is movable about the axis of rotation of said driven member, means for connecting said counter shaft and said driven member to transmit motion from one to the other, a pulley on said counter shaft, a pulley on said driving member, a belt to transmit motion between said pulleys, means whereby two or more different speeds can be given said pulley on said counter shaft without altering the speed of said pulley on said driving member, means for revolving said counter shaft carrier about the axis of said driven member to regulate the tension of said belt and a lever for controlling said mechanism connected both with the aforesaid speed changing means and with the belt tension regulating means, the former connection including a cam so shaped as to cause said speed changes to occur in proper relation to the movement of said belt tension regulating means and the latter connection also including a cam which latter cam is shaped so as to maintain a suitable tension on said belt when the different speeds are operative and during the changing thereof.

4. In a transmission gearing the combination of a rotary driving member, a rotary driven member, a counter shaft substantially parallel with both said driving and said driven members, a carrier for said counter shaft whereby said counter shaft is movable about the axis of rotation of said driven member, means for connecting said counter shaft and said driven member to transmit motion from one to the other, a pulley on said counter shaft, a pulley on said driving member, a belt to transmit motion between said pulleys, means co-acting with said belt whereby two or more different speeds can be given said pulley on said counter shaft without altering the speed of said pulley on said driving member, means for revolving said counter shaft carrier about the axis of said driven member to regulate the tension of said belt, and a lever for controlling said mechanism so connected both with the aforesaid speed changing means and with the belt tension regulating means that when said lever is moved to cause a change from one speed to another the said belt tension regulating means is operated to release the tension on said belt.

In testimony whereof I have signed my name to this specification in the presence of two subscribing witnesses.

ALDEN E. OSBORN.

Witnesses:
OLIVER CONGDON,
JOHN ALBERT BERNHARD.